(12) United States Patent
Hugelier

(10) Patent No.: US 11,364,628 B2
(45) Date of Patent: Jun. 21, 2022

(54) GRIPPER FOR SPOOLS

(71) Applicant: NV BEKAERT SA, Zwevegem (BE)

(72) Inventor: Johan Hugelier, Harelbeke (BE)

(73) Assignee: NV BEKAERT SA, Zwevegem (BE)

( * ) Notice: Subject to any disclaimer, the term of this patent is extended or adjusted under 35 U.S.C. 154(b) by 238 days.

(21) Appl. No.: 16/642,573

(22) PCT Filed: Aug. 27, 2018

(86) PCT No.: PCT/EP2018/072970
§ 371 (c)(1),
(2) Date: Feb. 27, 2020

(87) PCT Pub. No.: WO2019/042913
PCT Pub. Date: Mar. 7, 2019

(65) Prior Publication Data
US 2020/0346344 A1    Nov. 5, 2020

(30) Foreign Application Priority Data

Sep. 1, 2017    (EP) .................................... 17189010

(51) Int. Cl.
*B25J 9/16*    (2006.01)
*B25J 15/00*    (2006.01)
(Continued)

(52) U.S. Cl.
CPC ............ *B25J 9/1612* (2013.01); *B25J 9/1653* (2013.01); *B25J 9/1694* (2013.01); *B25J 13/08* (2013.01);
(Continued)

(58) Field of Classification Search
CPC ...... B25J 9/1612; B25J 9/1694; B25J 9/1653; B25J 15/0047; B25J 15/0028; B25J 13/08; B25J 15/08
(Continued)

(56) References Cited

U.S. PATENT DOCUMENTS

| 4,424,588 A | * | 1/1984 | Satoh | .................... G01B 11/022 |
| | | | | 348/94 |
| 4,723,884 A | * | 2/1988 | Brinker | .................. B65G 61/00 |
| | | | | 414/796.9 |

(Continued)

FOREIGN PATENT DOCUMENTS

| DE | 10 2007 013 623 | 10/2008 |
| EP | 0 577 986 | 1/1994 |

(Continued)

OTHER PUBLICATIONS

International Search Report dated Oct. 26, 2018 in International (PCT) Application No. PCT/EP2018/072970.

*Primary Examiner* — Paul T Chin
(74) *Attorney, Agent, or Firm* — Wenderoth, Lind & Ponack, L.L.P.

(57) ABSTRACT

A gripper for finding, clamping and releasing spools having a circular grip part such as a flange or a bore hole as well as a method to operate such gripper. The gripper has a driveable clamp that is provided with a scanning system comprising 'presence-absence detectors' that detect the presence or the absence of the circular grip part. The gripper is slowly moved over the flange of the spool and by means of the detectors and some calculation the centre of the grip part is identified followed by the gripping of the spool. The gripper has the advantage that no back-and-forth movement is needed in order to locate the circular grip part and that the superfluous motion of the gripper is prevented.

15 Claims, 4 Drawing Sheets

(51) Int. Cl.
*B25J 13/08* (2006.01)
*B65H 67/06* (2006.01)

(52) U.S. Cl.
CPC ....... *B25J 15/0028* (2013.01); *B25J 15/0047* (2013.01); *B65H 67/065* (2013.01)

(58) Field of Classification Search
USPC .................................................. 294/93, 94
See application file for complete search history.

(56) References Cited

U.S. PATENT DOCUMENTS

| | | | | |
|---|---|---|---|---|
| 4,776,027 A * | 10/1988 | Hisano | ................ | G05D 1/0246 |
| | | | | 382/288 |
| 4,803,735 A * | 2/1989 | Nishida | .................... | G06K 9/46 |
| | | | | 382/151 |
| 5,020,735 A * | 6/1991 | Inger | .................... | B65H 67/065 |
| | | | | 198/409 |
| 5,082,192 A * | 1/1992 | Langen | ................ | B65H 54/71 |
| | | | | 198/409 |
| 5,207,052 A * | 5/1993 | Fink | .................... | B65H 67/064 |
| | | | | 57/279 |
| 5,771,309 A | 6/1998 | Yamaoka et al. | | |
| 6,082,796 A | 7/2000 | Scaglia | | |
| 9,799,367 B1 * | 10/2017 | Zhu | .................... | G11B 17/038 |
| 10,008,235 B1 * | 6/2018 | Chang | ................ | G11B 17/223 |
| 10,965,078 B2 * | 3/2021 | Solanki | ................ | H01R 43/005 |
| 2009/0057479 A1 | 3/2009 | Ueda et al. | | |
| 2016/0158884 A1 | 6/2016 | Hagenlocher et al. | | |

FOREIGN PATENT DOCUMENTS

| | | |
|---|---|---|
| EP | 1 900 665 | 3/2008 |
| JP | 06-47238 | 6/1994 |

* cited by examiner

GRIPPER FOR SPOOLS

TECHNICAL FIELD

The invention relates to a gripper for finding, clamping and releasing spools. The gripper enables the automated handling of spools in an industrial environment.

BACKGROUND ART

In the production of elongated articles such as yarns, threads, ropes, cords, steel cords and the like final and intermediate products are carried on spools. The number of times a spool is picked up to make for example one final spool of a simple steel cord construction like 7×7 easily rises above hundred as not only the full spools have to be picked up but also the empty ones have to be removed. Therefore the making of the mentioned articles to a large extent reduces to the activity of picking up, moving and placing empty and full spools. There is therefore a constant desire to reduce this number of handlings e.g. by increasing the capacity of those spools or to automate the handling in order to eliminate this tedious and labour intensive task.

When automating the task of picking up a full or empty spool engineers are confronted with a complex and dynamic production environment. Indeed, a true production environment differs vastly of the virtual environment as defined in a computer. In real life not all the floors of a production hall are flat, not all machines are aligned as one would desire them to be, not all pick-up tables are at the same millimetre precise height. Human operators do not have the slightest difficulty to act within this irregular and sometimes random environment, but automates do.

In order to break down complexity one usually resorts to layers of intelligence wherein a global controller has the overall approximate picture of a machine hall, while local controllers overcome the final deviations at the end. These local controllers then have to 'find their way' based on inputs that are locally collected and by means of local algorithms find for example the exact position of a spool. As a last step the spool must be mechanically gripped or released.

Mechanical spool grippers positioned by human interaction and actuated by either human force or mechanical power are known. Such spool grippers can for example grip the circular flange of a spool. An example of such a flange clamp is described in US2009057479. Alternatively spool grippers can be inserted into the bore hole of the spool and clamp the spool by means of claws engaging a groove inside the bore hole. An example of this can be found in U.S. Pat. No. 6,082,796.

Algorithms for finding the position of a hole by preference a round hole are mainly based on camera vision as for example described in U.S. Pat. No. 5,771,309. Such methods require the use of CCD cameras that are relatively expensive.

EP 1 900 665 B1 describes a gripper for a bobbin having components for gripping a bobbin and a sensor device comprising range finding sensors. The sensors are arranged in two modules such that when a bobbin is transgressed at least one of the modules detects four transition points.

The coordinates of those four transition points are used to calculate the centre of the circle containing those coordinates.

An alternative way of finding the centre of a hole in a plate is described in US2016/0158884. There a laserhead follows a meandering path in order to find the centre of a calibration hole. This makes the location of the centre time-consuming as a meandering path must be followed.

A further algorithm is described in DE10 2007 013 623 A1 wherein two mutual orthogonal line scans are made. The first scan detects a first pair of border points at the border of the hole and a first middle point of those border points is calculated. A second scan, orthogonal to the first scan, goes through this first middle point and determines the crossing of that line at the hole edge leading to the second pair of border points of which the second middle point is calculated. The second middle point is already close to the centre of the hole. A third scan, orthogonal to the second scan, goes through the second middle point and a third pair of border points is determined. Based on those points the final centre point is calculated. The procedure requires a number of mutually orthogonal scans.

In order to find faster ways that require less expense hardware, the inventors come up with the solution that will be described in what follow:

DISCLOSURE OF INVENTION

The main object of the invention is to eliminate the described drawbacks of the prior art: too expensive equipment and/or too slow determinations of the centre of a hole. A second object is to provide algorithms, methods that allow for a fast and reliable determination of the bore hole of a spool. The methods are used to locally guide a spool gripper towards a spool and clamp it in a fast and reliable way. A third object is to provide a gripper that is particularly suitable to find and grip spools in an industrial environment.

According a first aspect of the invention a gripper for finding, clamping and releasing spools is claimed in the independent product claim. The spools to be gripped have to be provided with a 'circular grip part'. The circular grip part can for example be the flange of the spool or it can be the bore hole. Alternatively, the grip part can be a specially provided concentric flange that the gripper detects and uses to clamp the spool. There is no limitation to the grip part other than that it must be circular and must allow gripping with the 'driveable clamp'.

Indeed, the gripper comprises 'a driveable clamp' for clamping and releasing the grip part on demand. 'Driveable' means that the clamp can be actuated by means of mechanical, electrical, magnetic, pneumatic, hydraulic or any other power source. The clamp can be moved on command in a prescribed direction in the reference plane or parallel to the reference axis. With 'on demand' is meant that the clamp will open or close based on an input signal to the clamp. The clamp has a reference axis that moves and turns with the clamp. When the clamp holds a spool by the grip part the axis of the spool coincides with the reference axis of the driveable clamp. The reference axis defines a reference plane that is oriented perpendicular to the reference axis. The clamp has a clamp size configured in accordance to the diameter of the circular grip part of the spool so as to mate with, grip, or seize the circular grip part of the spool.

The gripper further comprises a scanning system. The scanning system is designed to identify and find the grip part on the spool to be gripped. The scanning system comprises two or more sensors organised equidistant along a line. The line is preferably straight as this results in the easiest calculations. By preference all sensors are on the same line.

The sensors only detect the presence or absence of a body—such as a spool—in the direction parallel to the reference axis. During movement of the gripper the sensors may switch from a state wherein no body is detected to a state wherein a body is detected within the range of the sensor. The opposite wherein first a body is detected within the range and after movement no body is detected can occur equally well. Both changes of detection state will be called a 'changeover'. The detection range of the sensor needs not be above one meter, for example half a meter is useable. Preferably the sensors have a lateral resolution of below one centimetre for example below 3 or 2 mm.

The sensors are 'presence-absence detectors' and can for example be based on the reflection of light. The sensor emits a collimated light beam and also detects the light reflected by a body obstructing the light beam. Typically laser or collimated LED light can be used to this end possibly frequency modulated to increase the detection limit. Possibly the sensor may be able to detect the distance from the sensor to the reflecting body but this makes the sensor more expensive. The wavelength used can be in the infrared, the visible or the ultraviolet spectrum. Visible light has the advantage that the beam spots become visible to the human eye on the spool as the gripper moves.

Alternative directional sensors such as acoustic sensors might also be considered although these may not be cheaper and will not give better results.

The distance between any two adjacent, neighbouring sensors (called '$\Delta$' hereinafter) is less than the clamp size. The distance between the adjacent sensors determines the 'resolution' of the scanning system. Obviously it is best if the distance between adjacent sensors is less than the clamp size in order not to miss any grip parts when they pass by the sensor array. Even more preferred is if the distance between two adjacent sensors is between a quarter and three quarters of the clamp size. Best is if the distance between adjacent sensors is between a quarter and half the clamp size for reasons that will become apparent later on.

The number of sensors is two or more. If two, three or four sensors are present on the scanning system, the global positioning of the gripper must be fairly good before the detection process starts in order to prevent the need for multiple sweeps. Conversely five to ten sensors will increase the detection width of the scanning system but of course this will come with a price. The gripper may also become unwieldly wide thereby obstructing the movement of the gripper on a robotic arm. Most preferred is if two sensors are present as this is least costly.

When the reference axis of the clamp is on the perpendicular bisector of two adjacent sensors the movement of the driveable clamp is reduced as the two adjacent sensors are nearest to the reference axis. This is the preferred placement if the number of sensors is even. Alternatively if the number of sensors is odd, it is best that the reference axis is situated on an upright, perpendicular to the line of sensors with the middle sensor at the foot point of that upright.

The perpendicular distance 'd' in the reference plane between the reference axis and the line formed by said two or more sensors is by preference less than the clamp size. In this way the movement of the gripper—once the centre position of the grip part is identified—is reduced to a minimum. This has the advantage that the centre of the spool is readily located and less time is lost in clamp movement. Alternatively this perpendicular distance should be larger than half of the diameter of the grip part in order to prevent that the gripper must move back after having identified the centre position of the grip part.

When the circular grip part of the spool is the bore hole of the spool, the clamp may be in the form of a shaft that—with sufficient play—fits the bore hole and holds the spool by the bore hole. The clamp size is then equal to the diameter of the shaft. The shaft can be provided with a number of equiangularly organised, spring mounted claws. The bore hole is foreseen with an internal circumferential groove in which the claws fit upon insertion of the shaft and thereby hold the spool to the clamp. To release the clamp, the claws are retracted radially thereby allowing the shaft to move out of the bore hole.

When the circular grip part of the spool is the spool flange, the clamp can be provided with spring mounted, grooved, circular segments that hold the flange when slid over the flange. The clamp size is then equal to the diameter of the circle formed by the grooved circular segments when closed i.e. equal to the flange diameter. For removal of the clamp, the circular segments are radially moved thereby liberating the flange.

According a second aspect of the invention a method is claimed to operate the gripper as described before. There are basically two operating modes for the gripper: one wherein the diameter of the circular grip part is known, and one wherein this diameter is not known. In the description of the method equal steps will be denominated by the same letters ((a), (b), . . . ). If steps are repeated or altered the letters will be provided with an apostrophe ((e), (e'), . . . ). For convenience it will be assumed that the two or more sensors are situated along the X-axis with increasing X value from left to right when looking in the emitting direction of the sensors. The position of the two or more sensors is known and is a multiple of the distance between adjacent sensors. The perpendicular to the line of sensors through the reference axis defines x=0. The number of sensors will be named with 'N' and N=2, 3, 4 or any positive integer number. The total width of the scanning system is thus $(N-1)\times\Delta$. The Y-axis is oriented in the direction perpendicular to the X-axis and increases along the movement direction of the gripper.

The first mode of operation goes as follows:

In step (a) the gripper is positioned in the vicinity of the spool such that the reference axis of the gripper is about parallel—within +/−5°—to the spool to be gripped. With 'in the vicinity' is meant that the reference axis is within two or three diameters of the circular grip part removed from the spool axis. The gripper can e.g. be fixed on a mechanical arm that is mounted on an automatically guided vehicle. Alternatively the gripper can be mounted on a robot arm that is moving on overhead rails in the factory. Still alternatively the gripper can be attached to the machine it is serving.

The initial positioning of the gripper is performed based on input from a global controller that has an overview of where spools are situated (in three dimensional space (x,y, z)), how they are oriented (two angles) and what their sizes are (approximated length and diameter, possibly supplemented with size of bore hole). The global controller for example controls the arm on which the gripper is situated. For simplicity the orientation of the spool will be kept either vertical i.e. with the bore hole oriented along the direction of gravity or horizontal i.e. with the bore hole in a plane perpendicular to the vertical. However, the method is equally well suited for other deviating orientations.

In step (b) the movement of the gripper is taken over by a local controller.

For example the movement of the arm on which the gripper is mounted that is in step (a) still under control of the global controller is now taken up by the local controller. The local controller controls actuators that can move the gripper in the reference plane and along the reference axis. Possibly the local controller can control the local orientation of the gripper but this is not a prerequisite of the inventive method.

In step (c) the local controller is informed by the global controller of the diameter of the circular grip part. The value of the diameter is an input to the local controller.

In step (d) the gripper is moved in the reference plane. The movement is always in a direction wherein the two or more sensors are ahead of the reference axis i.e. the sensors sense the field in front of the clamp. By preference the movement is in the direction perpendicular to the line formed by the two or more sensors. The movement is relatively slow (between 1 to 10 cm/s) in order to enable the local controller to record the distance travelled from a zero value. The total travel by the gripper is within a limited travel length. For example limited by the hardware the gripper is mounted on or by some preset value of two times the flange diameter of the spool or any other reasonable travel length. This is to intercept possible defective placement of spools e.g. spools that are not present in contrast with what the global controller presumes. The start position of the gripper at takeover by the local controller is used as its point of reference in the direction of movement (y=0)

In step (e) the gripper is moved and a first changeover of the circular grip part is detected by any one of the sensors that thus becomes the 'first sensor'. The position of the first sensor is known and the travelled distance is recorded hence a first point $(x_1,y_1)$ can be recorded.

The step (e) is continued as step (e') until a second changeover of the circular grip part is detected by any one of the sensors that is then the 'second sensor'. Likewise the position of the second sensor and the travelled distance is known and a second point $(x_2,y_2)$ can be recorded.

In step (f): based on the first and second point coordinates and the knowledge of the diameter of the grip part the local controller calculates the centre position of the circular grip part in the plane of reference. In general there will be two solutions to this problem, but one of them can be readily eliminated.

In step (g) the reference axis of the gripper is moved to this calculated centre position.

The procedure is finalised by step (h) wherein the gripper clamps and holds the spool by the circular grip part. For example this may be done by insertion of the shaft into the bore hole of the spool or by the clamping of the flange of the spool.

Two different cases can occur in the method. In the first case the first and second sensor are different sensors that are necessarily adjacent sensors. In that case the solution to be chosen in step (f) is the one having the largest y-coordinate. If the solution with the lower y-coordinate would be chosen this would result in a contradiction with the movement direction of the sensors i.e. this configuration would have been detected earlier in the traveling motion of the gripper hence the first and second point would not be the first and second detected point.

In the second case the first and second sensor are one and the same i.e. this one sensor—that is an outer sensor— detects a first and second point, but the adjacent sensors to not sense any changeover. In that case the solution to be chosen in (f) is the solution with the x-coordinate of the centre to the side opposite of the non-detecting sensor or sensors. However, this requires that the distance between the sensors must be smaller than half the diameter of the circular part, otherwise there may scan regions where it is not certain what solution is to be chosen.

The total width wherein the centre of the grip part can be identified and calculated by the gripper will be called the 'scan width W'. In the first mode of operation any changeover within a range of a little bit less than $(N-1) \times \Delta + 2 \times R$ will be detected. 'R' corresponds to half of the diameter for the circular grip part. But only when $\Delta < R$ the centre can be uniquely identified. Hence W is just slightly less than $(N+1) \times R$.

In the second mode of operation, the diameter of the circular part of the spool is not used in the calculation of centre position of the circular grip part by the local controller. The steps (a) and (b) are identical to the ones in the first mode of operation. However, as the diameter of the circular part of the spool is not used, step (c) is optional and can be omitted.

The steps (e) and (e') remain as in the first mode of operation but now the procedure is continued with step (e'') wherein a third changeover in the presence of the circular grip part is detected at a third sensor and the travelled distance at that third changeover is recorded as a third point $(x_3,y_3)$.

Hence three points are known $(x_1,y_1)$, $(x_2,y_2)$ and $(x_3,y_3)$. Based on three points on the circle, the position of its centre $(x_0,y_0)$ can be uniquely determined what is done in step (f'). The remaining steps (g) and (h) remain the same as in the first mode of operation.

In the second mode of operation, a first case occurs when the three points are detected by three different sensors. This can occur only if the distance between adjacent sensors is less than half the diameter of the circular part.

Two other equivalent cases can occur when the third sensor is equal to the first sensor or when the third sensor is equal to the second sensor. In that case calculation of the centre point of the circular part is somewhat simpler. Also here the distance '$\Delta$' between the sensors must be a little bit less than R in order to always 'catch' at least 3 points. On the other hand in this mode of operation when the edge sensors only detect two changeovers, no centre can be calculated. The maximum scan width is therefore just less than $(N-1) \times R$.

When three points are known on the circle and its centre has been calculated, the radius 'R' can easily be derived as the distance of the centre to any one of the three points. Hence the diameter of the circular grip part is twice this radius i.e. 2R. In principle this is a superfluous information but it can be useful if also the diameter of the circular grip part is also known from other sources for example from the global controller.

Hence, in a further preferred embodiment of the second mode of operation, the step (c) is introduced where the diameter of the circular grip part is an input supplied to the local controller by the global controller. By now calculating the diameter of the circular grip part and comparing it with the input value one can establish whether the spool as expected is ready for picking. If for example the relative difference between the values is larger than 1% or 2% or even 5% an alarm can be emitted in order to trigger a corrective action. This is what happens in step (f''').

Of course it can occur that the positioning of the gripper is off by more than the scanning width W. In that case step (d) ends at the limited travel length. This means that in the first or second mode of operation no changeover has been detected. When this occurs the gripper is repositioned to its original position, shifted along the along the line of sensors over a shift that is equal to the distance between adjacent sensors '$\Delta$' times the number of sensors 'N' and the scan is restarted i.e. step (d) is repeated.

A reasonable limit for the travel length is when the gripper has travelled the diameter of the circular grip part after the detection of the first changeover. Alternatively, the limited travel length is reached when half of the diameter of the circular grip part is reached.

An advantage of the gripper is that the sensors go before the clamp. Hence, no backward movement of the gripper is needed (unless the limited travel length is reached). This prevents back-and-forth movements that may confuse the location tracking of the controller due to acceleration forces.

BRIEF DESCRIPTION OF FIGURES IN THE DRAWINGS

Like parts over different figures have the same unit and tens number while the hundred number refers to the figure number.

MODE(S) FOR CARRYING OUT THE INVENTION

Figure 1:
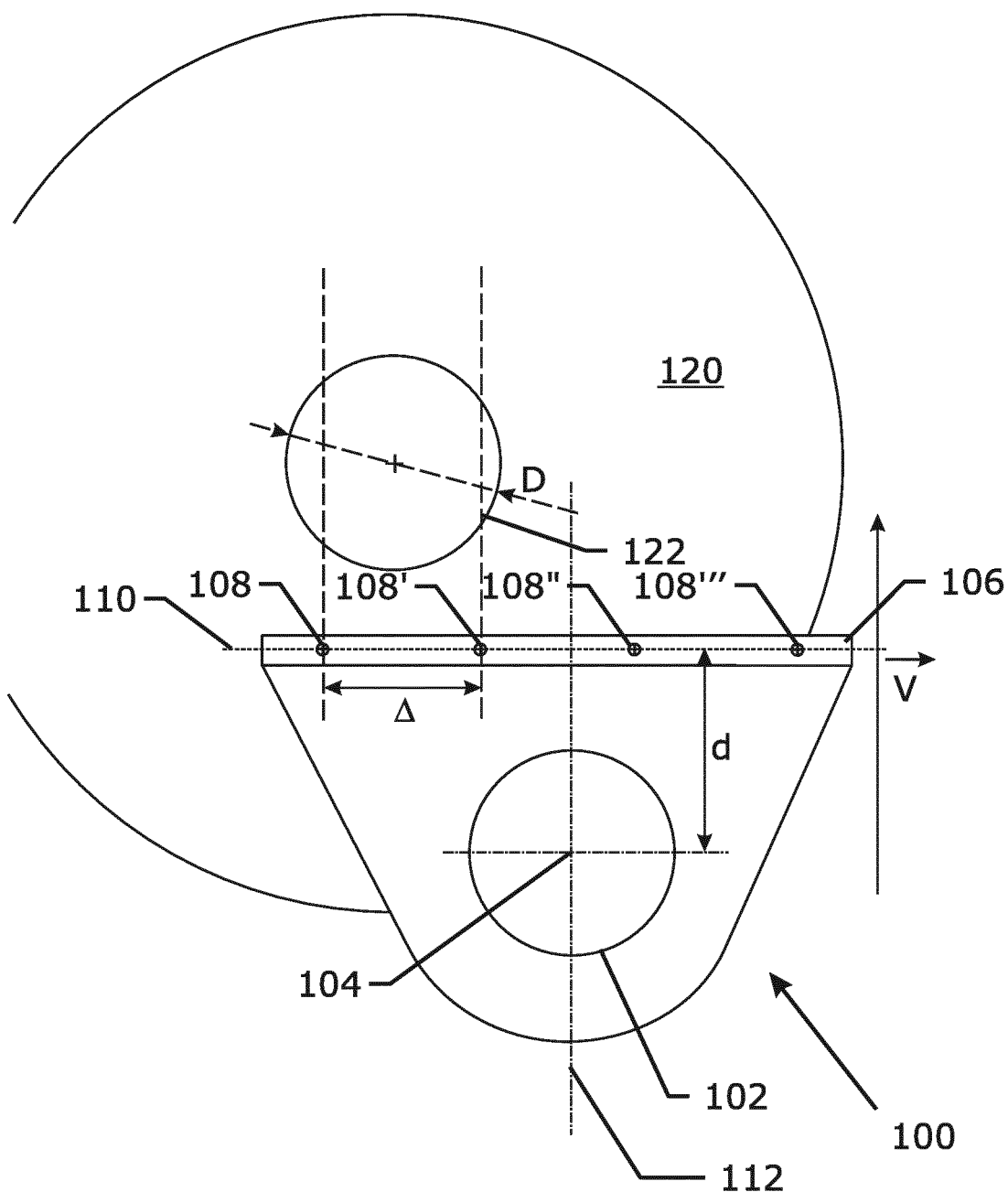
FIG. 1 shows a general overview of the gripper according the invention in its most general form.

FIG. 1 shows a view from above of a general embodiment of the gripper 100. The gripper comprises a driveable clamp 102 that is mounted on an arm of a robot or automatically guided vehicle or similar device (not shown). The clamp 102 has a reference axis indicated with 104 that is in this case perpendicular to the plane of the sheet. The spool to be gripped is shown as 120 and has a circular grip part 122 that is in this case the bore hole of the spool 120. The circular grip part 122 has a diameter indicated with 'D'. The clamp size—corresponding to the diameter of the clamp 102—is thus slightly less than D in order to allow insertion of the clamp into the bore hole. The gripper has a scanning system 106 comprising four sensors indicated with 108, 108', 108", 108''' on a line 110. The sensors are separated from one another by a distance 'Δ'. The distance A is just less than D/2 for example 0.45×D. The sensors sense the presence or absence of the spool body 120 in a direction parallel to the reference axis 104. The sensors are for example photoelectric presence-absence sensors based on reflection of light such as the LR-W series of Keyence.

The reference axis 104 is situated on the perpendicular bisector 112 between the two adjacent sensors 108' and 108". The perpendicular distance between the reference axis 104 and the line of sensors 110 is indicated with 'd'. 'd' is less than the diameter D but larger than D/2. During use the gripper scans for the presence of the circular grip part in the direction $\vec{v}$ in parallel with the perpendicular bisector 112.

Figure 2A:
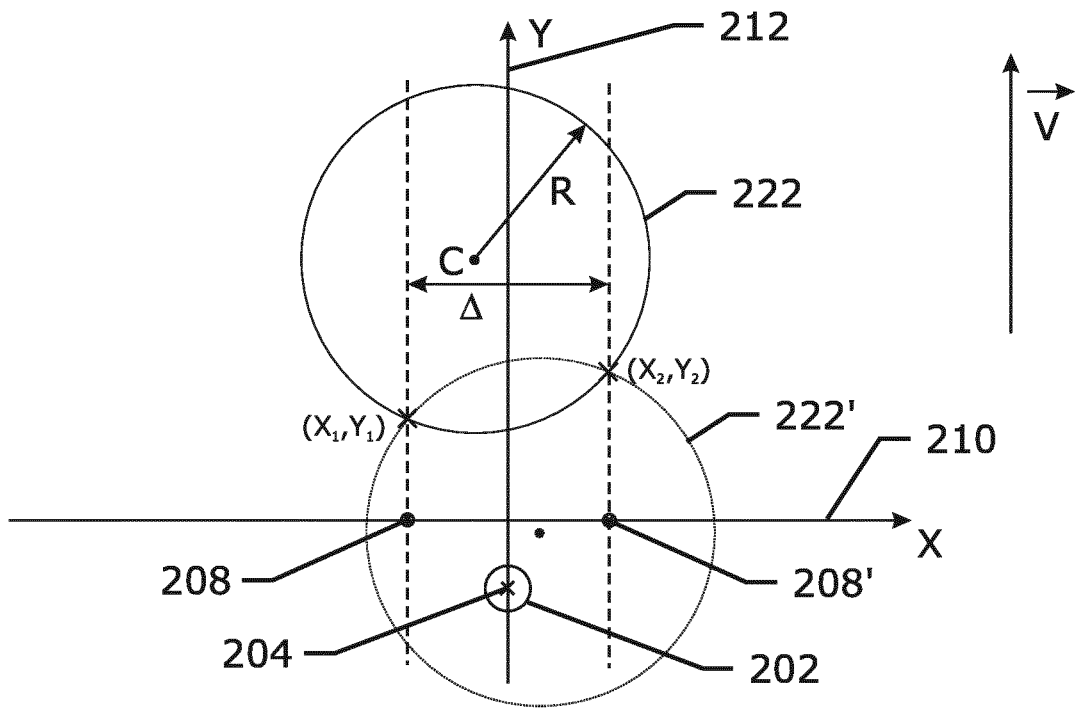
FIGS. 2a and 2b illustrates the first and second case of the first mode of operation.
Figure 2B:
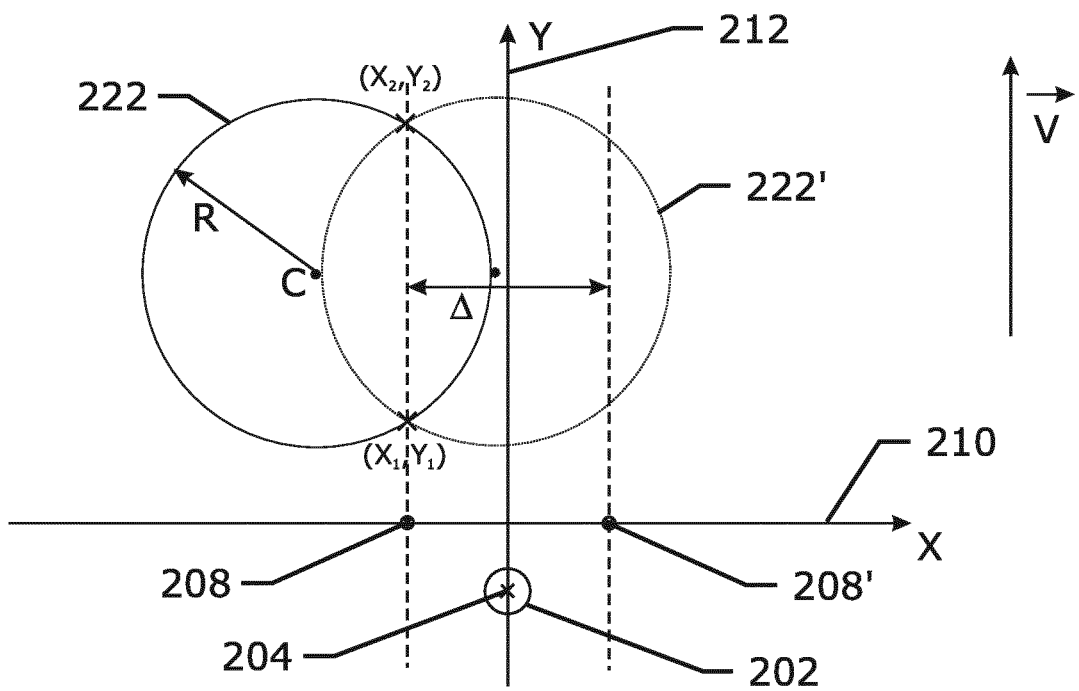

The first mode of operation of the gripper is illustrated in FIGS. 2a and 2b. Here the case of two sensors (N=2) is used to illustrate the working. A fixed reference frame is constructed with the X-axis along the line of sensors 210 and the Y-axis along the perpendicular bisector 212. 'y' coordinates increase with the movement of the gripper $\vec{v}$. Hence, the first sensor 208 is initially situated at coordinates (−Δ/2, 0) and the second sensor at (+Δ/2, 0). The reference axis 204 is initially situated at (0, −d). As the gripper moves, the X-coordinates remain invariant, but the Y-coordinates increase. When the local controller takes over, the Y-coordinate is zeroed.

First the gripper is positioned in the vicinity of the spool and the reference axis 204 is brought in alignment with the axis of the spool under the control of the global controller. The global controller will also indicate a direction of movement $\vec{v}$ to the local controller. The diameter D of the circular grip part is transmitted to the local controller by the global controller. Then control of movement is surrendered to the local controller. The radius of the circular grip part is indicated with 'R' in FIG. 2 and is equal to D/2.

Then the local controller moves the gripper in the direction $\vec{v}$ at slow speed in the reference plane with the two sensors 208 and 208' ahead of the reference axis 204. At $(x_1, y_1)$ a first changeover—from the spool flange to the bore hole—is detected by sensor 208 defining a first point at $(-\Delta/2, y_1)$ wherein '$y_1$' is the distance travelled along direction $\vec{v}$. The scan continues until the second sensor 208' detects a second changeover—again from the spool flange to the bore hole—at the point $(x_2, y_2)$. The second point thus has coordinates $(+\Delta/2, y_2)$.

Now the local controller calculates the position of the centre 'C' of the circular grip part as follows:

First the distance 'a' between the first and second point is calculated:

$$a = \sqrt{(x_2-x_1)^2+(y_2-y_1)^2} = \sqrt{\Delta^2+(y_2-y_1)^2}$$

Then the quantity 'Δ' is calculated $$A = \sqrt{\frac{D^2}{a^2} - 1}$$

Now the two possible solutions for the centre 'C' have coordinates $(x_0, y_0)$:

$$x_0 = \tfrac{1}{2}[(x_2+x_1) \pm A(y_2-y_1)] \text{ and } y_0 = \tfrac{1}{2}[(y_2+y_1) \mp A(x_2-x_1)]$$

In this case the solution with the highest $y_0$ must be chosen as the other solution—indicated with 222' in FIG. 2a—would not be commensurate with the order of first and second detected point resulting in:

$$x_0 = \tfrac{1}{2}[A(y_2-y_1)] \text{ and } y_0 = \tfrac{1}{2}[(y_2+y_1) \mp A\Delta]$$

Note that if 208' would detect the first changeover the sign of $x_0$ must be reversed.

In the second case of the first mode of operation one of the sensors 208 detects a first changeover—from spool flange to bore hole—but the same detector 208 also detects a second changeover—from bore hole to flange—while the other sensor 208' does not detect any changeover. In that case the coordinates of $(x_1, y_1)$ become $(-\Delta/2, y_1)$ and of $(x_2, y_2)$ are $(-\Delta/2, y_2)$.

Hence the formulas simplify to:

$$a = \sqrt{(x_2-x_1)^2+(y_2-y_1)^2} = |y_2-y_1|$$

and $$x_0 = \tfrac{1}{2}[-\Delta - A(y_2-y_1)] \text{ and } y_0 = \tfrac{1}{2}[(y_2+y_1)]$$

wherein the leftmost solution must be chosen as the alternative solution—indicated with 222' in FIG. 2b—would have been detected by sensor 208'. Mutatis mutandis the reasoning and formulas also holds when 208' only detects two changeovers when passing to the left of the centre point 'C' but then the other solution must be chosen resulting in:

$$x_0 = \tfrac{1}{2}[\Delta + A(y_2-y_1)] \text{ and } y_0 = \tfrac{1}{2}[(y_2+y_1)]$$

The position of the centre of the circular grip part is thus known in the fixed reference frame. Now the reference axis 204 of the clamp 202 still has to be moved to the correct position. As at the moment of the detection of the second changeover, the reference axis is situated at $(0, y_2-d)$ only a translation from there to $(x_0, y_0)$ must be completed or a final translation of $(x_0, y_0-y_2+d)$.

Note that in this procedure the total scan width W is equal to $\Delta+2R$ with the proviso that A is smaller than R.

Figure 3A:
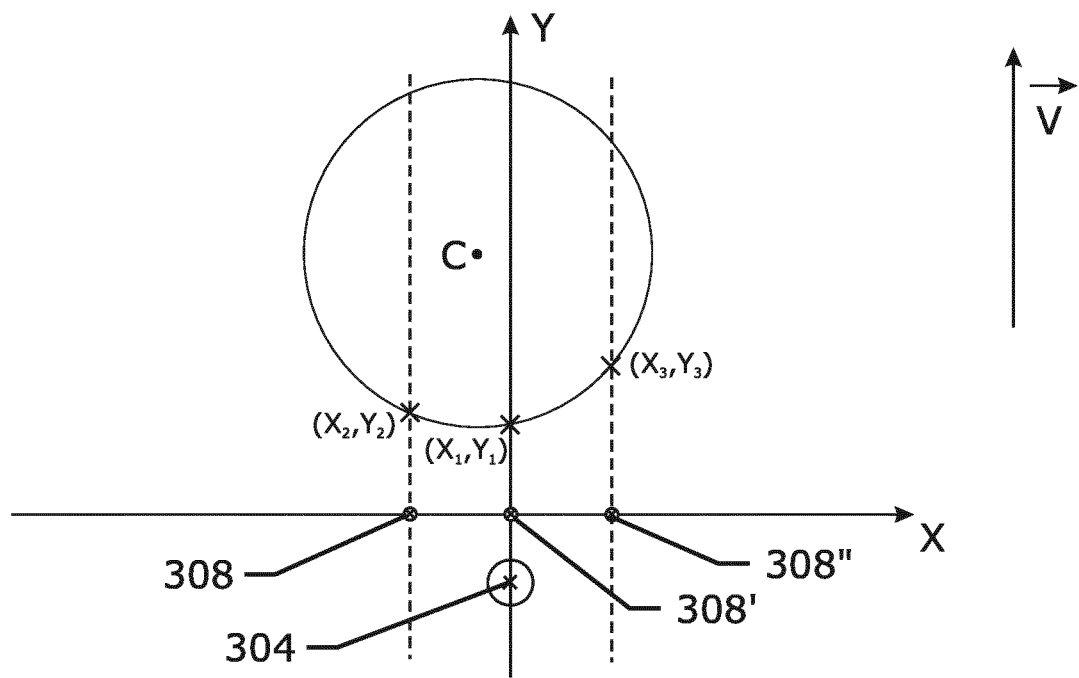
FIGS. 3a and 3b illustrate the first and second case of the second mode of operation
Figure 3B:
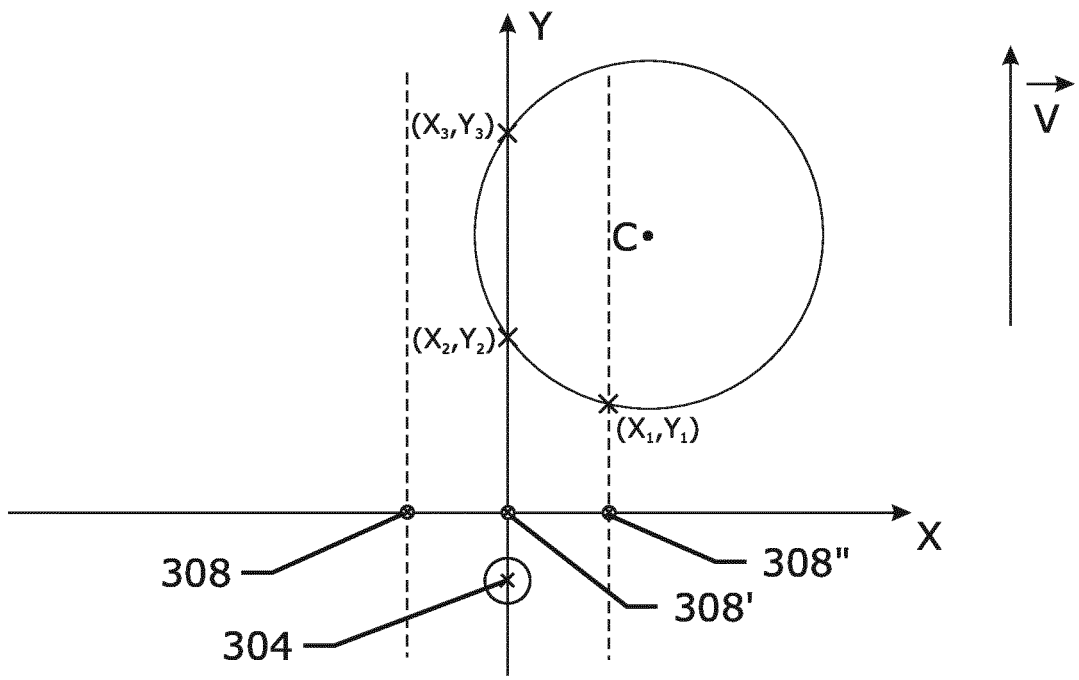

FIGS. 3a and 3b illustrate the second mode of operation wherein the diameter of the circular grip part is initially not known. The method is illustrated with three sensors (N=3) although it equally well works with two sensors. The X-axis of the fixed reference frame is taken along the line of the sensors. The zero of the X-axis is taken at the perpendicular through the reference axis 304. The reference axis is thus situated at $(0,-d)$. The Y-axis is parallel to the movement direction $\vec{v}$ and is zeroed at the start of the scan.

When scanning it may occur that first the sensor 308' notices a changeover thereby recording the point $(x_1,y_1)$ followed by the sensor 308 that records point $(x_2,y_2)$ and finally by sensor 308" that records point $(x_3,y_3)$. As soon as three changeovers have been detected, the position of the centre 'C' $(x_0,y_0)$ of the circular part is calculated with the formulas:

$$\text{Det} = \begin{vmatrix} x_1 & y_1 & 1 \\ x_2 & y_2 & 1 \\ x_3 & y_3 & 1 \end{vmatrix}, r_1^2 = x_1^2 + y_1^2, r_2^2 = x_2^2 + y_2^2, r_3^2 = x_3^2 + y_3^2$$

$$x_0 = \frac{\begin{vmatrix} r_1^2 & y_1 & 1 \\ r_2^2 & y_2 & 1 \\ r_3^2 & y_3 & 1 \end{vmatrix}}{2\,\text{Det}} \quad y_0 = \frac{\begin{vmatrix} x_1 & r_1^2 & 1 \\ x_2 & r_2^2 & 1 \\ x_3 & r_3^2 & 1 \end{vmatrix}}{2\,\text{Det}}$$

In this case there is only one possible solution for 'C'.

Alternatively the situation as depicted in FIG. 3b may occur. There the first changeover is detected by sensor 308" thereby defining the first point $(x_1,y_1)$. Thereafter the sensor 308' detects the two changeovers at $(x_2,y_2)$ and at $(x_3,y_3)$. As soon as these three points are known the position of the centre point 'C' with coordinates $(x_0,y_0)$ can be calculated with the same formulas as above. Again there is only one possible solution for 'C'.

At the moment three changeovers have been detected, the reference axis 304 is at position $(0, y_3-d)$. The gripper than only has to translate over the vector $(x_0,y_0-y_3+d)$ to position the reference axis 304 in line with the centre point 'C'. When positioned the gripper shaft can be introduced into the bore hole by translation along the reference axis.

As now the centre point 'C' of the circular grip part is known, the radius and the diameter D can easily be calculated as the distance between any one of the recorded points and 'C'. The result can be compared to the diameter of the circular grip part obtained from the global controller in order to verify whether the correct spool is present.

If none or only two changeovers have been detected when the limited travel length is reached, the procedure is repeated after having repositioned the gripper to its starting position and having it shifted in the direction away from the sensors that have not detected any changeover over a length that is equal to the $N \times \Delta$. A reasonable travel limit length is reached when after a first changeover detection the scan is continued for a length equal to the diameter of the circular grip part. If that diameter is not known, then a maximum diameter of all circular grip parts used within the fracture can be used as a limit.

Figure 4:
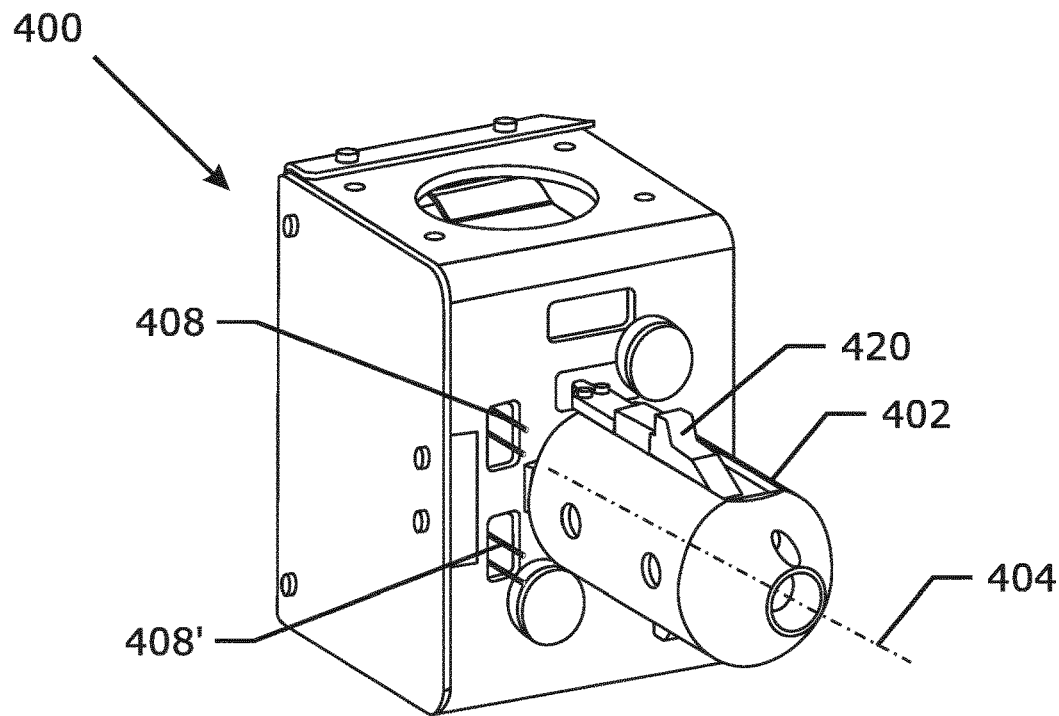
FIG. 4 shows an actual embodiment of the gripper.

FIG. 4 shows an actual implementation of the gripper 400 with all the various components: the reference axis 404 is indicated with the driveable clamp 402. The clamp is provided with claws 420 that engage with an internal groove in the bore hole of the spool. The claws 420 can be retracted in order to release spool upon command. Two laser presence-absence detectors 408 and 408' are indicated that—during movement of the gripper—precede the clamp 402.

Figure 5:
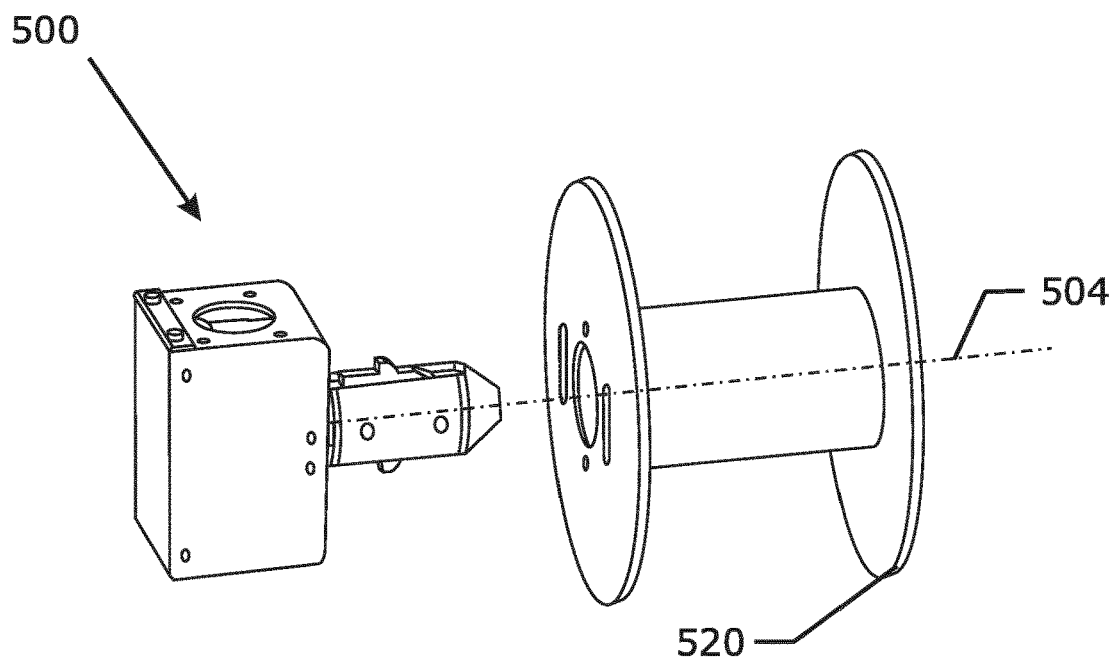
FIG. 5 shows how the gripper aligns with the spool.

FIG. 5 shows the alignment of the clamp 500 with the spool 520 when the reference axis is in line with the axis of the spool prior to the gripping of the spool.

The invention claimed is:

1. A gripper for finding, clamping and releasing a spool with a circular grip part comprising
  (i) a driveable clamp for clamping and releasing said grip part on demand, said clamp having a reference axis, said reference axis coinciding with the center axis of the spool when clamped, said clamp having a clamp size, the clamp size being configured to correspond to a diameter of the circular grip part of the spool; and
  (ii) a scanning system for identifying the axis of the spool, wherein said scanning system comprises two or more sensors organized equidistant along a line, said two or more sensors for sensing in a direction parallel to said reference axis the presence of the spool, said reference axis defining a reference plane perpendicular to said reference axis, wherein the distance between any two adjacent sensors is between a quarter and half of the clamp size.

2. The gripper of claim 1 wherein said reference axis is situated on the perpendicular bisector between two adjacent sensors in the reference plane, said two adjacent sensors being closest to the reference axis.

3. The gripper of claim 1 wherein said reference axis is situated on the perpendicular to said line at one sensor.

4. The gripper of claim 1 wherein the perpendicular distance in the reference plane between said reference axis and said line is less than the clamp size.

5. The gripper of claim 4 wherein the perpendicular distance in the reference plane between said reference axis and said line is more than half the clamp size.

6. The gripper according to claim 1 wherein the circular grip part is the bore hole of a spool, and said clamp is a shaft for insertion and holding in the bore hole, said clamp size corresponding to the diameter of said shaft.

7. The gripper according to claim 1 wherein the circular grip part is the flange of the spool and said clamp is a flange clamp for clamping and holding at the flange, said clamp size corresponding to the diameter of said flange.

8. A method for handling a spool by means of a gripper for finding, clamping and releasing a spool with a circular grip part comprising
  (i) a driveable clamp for clamping and releasing said grip part on demand, said clamp having a reference axis, said reference axis coinciding with the center axis of the spool when clamped, said clamp having a clamp size, the clamp size being configured to correspond to a diameter of the circular grip part of the spool; and
  (ii) a scanning system for identifying the axis of the spool, wherein said scanning system comprises two or more sensors organized equidistant along a line, said two or more sensors for sensing in a direction parallel to said reference axis the presence of the spool, said reference axis defining a reference plane perpendicular to said reference axis, wherein the distance between any two adjacent sensors is less than the clamp size and wherein said method comprises the steps of:
- (a) positioning the gripper in the vicinity of the spool, such that said reference axis is parallel to the axis of the spool to be gripped;
- (b) providing a local controller for controlling the movement of said gripper;
- (c) inputting the diameter of the circular grip part to said local controller from a global controller;
- (d) moving said gripper in said reference plane with said two or more sensors ahead of said reference axis while recording the travelled distance over a limited travel length;
- (e) detecting a first changeover in the presence of the circular grip part at a first sensor and recording the travelled distance at that changeover as a first point;
- (e') detecting a second changeover in the presence of the circular grip part at a second sensor and recording the travelled distance at that changeover as a second point;
- based on said first and second point and said diameter, calculating the centre position of said circular grip part in said reference plane;
- (g) moving said reference axis to said calculated centre position; and
- (h) clamping and holding the spool by the circular grip part.

9. The method according to claim 8 wherein the first and second sensor are adjacent sensors.

10. The method according to claim 8 wherein the first and second sensor are one and the same.

11. The method according to claim 8, wherein in case step (d) ends at the limited travel length the gripper is repositioned to its original position and shifted along the line of said sensors over a shift that is equal to the distance between adjacent sensors times the number of sensors and the step of (d) is repeated.

12. The method according to claim 8 wherein said limited travel length ends when the gripper has travelled the diameter of the circular grip part after the detection of the first changeover.

13. A method for handling a spool by means of a gripper for finding, clamping and releasing a spool with a circular grip part comprising
- (i) a driveable clamp for clamping and releasing said grip part on demand, said clamp having a reference axis, said reference axis coinciding with the center axis of the spool when clamped, said clamp having a clamp size, the clamp size being configured to correspond to a diameter of the circular grip part of the spool; and
- (ii) a scanning system for identifying the axis of the spool, wherein said scanning system comprises two or more sensors organized equidistant along a line, said two or more sensors for sensing in a direction parallel to said reference axis the presence of the spool, said reference axis defining a reference plane perpendicular to said reference axis, wherein the distance between any two adjacent sensors is less than the clamp size and wherein said method comprises the steps of:
- (a) positioning the gripper in the vicinity of the spool, such that said reference axis is parallel to the axis of the spool to be gripped;
- (b) providing a local controller for controlling the movement of said gripper;
- (d) moving said gripper in said reference plane with said two or more sensors ahead of said reference axis while recording the travelled distance over a limited travel length;
- (e) detecting a first changeover in the presence of the circular grip part at a first sensor and recording the travelled distance at that changeover as a first point;
- (e') detecting a second changeover in the presence of the circular grip part at a second sensor and recording the travelled distance at said second changeover as a second point;
- (e") detecting a third changeover in the presence of the circular grip part at a third sensor and recording the travelled distance at said third changeover as a third point;
- (f) based on said first, second and third point, calculating the centre position of said circular grip part in said reference plane;
- (g) moving said reference axis to said calculated centre position; and
- (h) clamping and holding the spool by the circular grip part.

14. The method according to claim 13 wherein said third sensor is either said first or said second sensor.

15. The method of claim 13 wherein, after step (b), the step (c) is introduced:
- (c) inputting the diameter of the circular grip part to said local controller from a global controller;

and, after step (f'), step (f") is introduced:
- (f") calculating the diameter of the circular grip part and emitting an alarm when the calculated and input values differ by more than 5%.

\* \* \* \* \*